June 26, 1923.

E. BLAU 1,459,874

CURVE FORMING REST FOR MACHINE TOOLS

Filed April 12, 1922

Inventor:
Ernst Blau
By [signature]
Attorney.

June 26, 1923.

E. BLAU 1,459,874

CURVE FORMING REST FOR MACHINE TOOLS

Filed April 12, 1922   7 Sheets-Sheet 2

Inventor:
Ernst Blau
By [signature]
    Attorney.

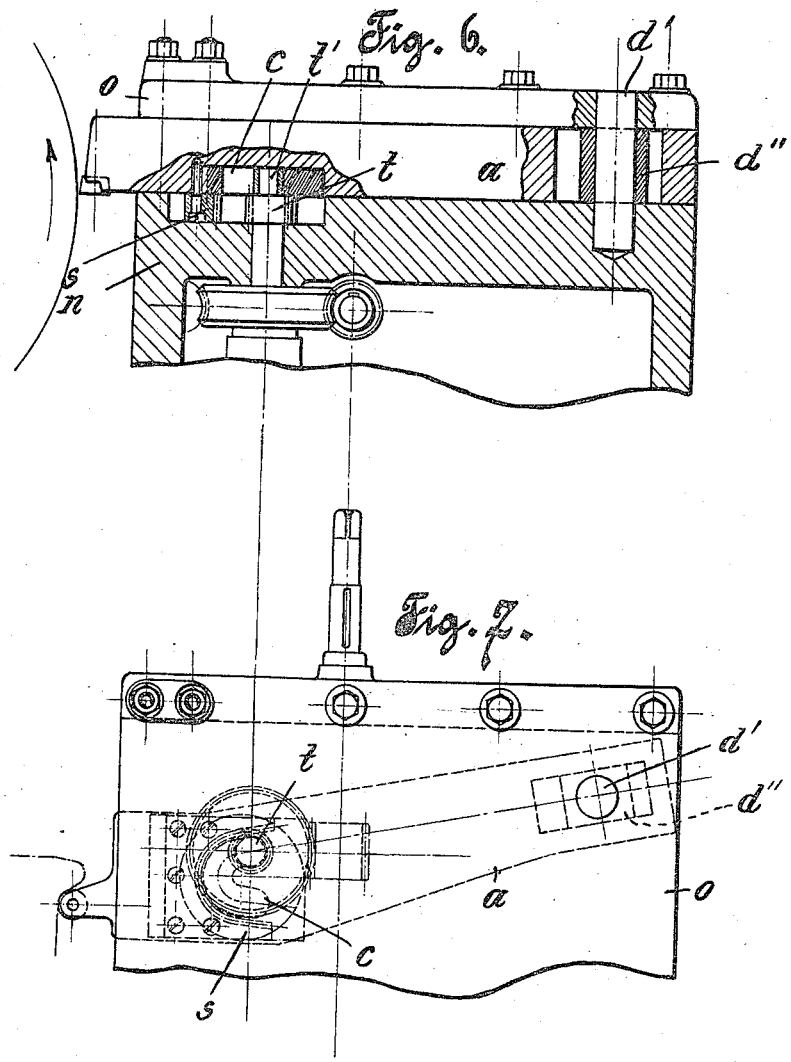

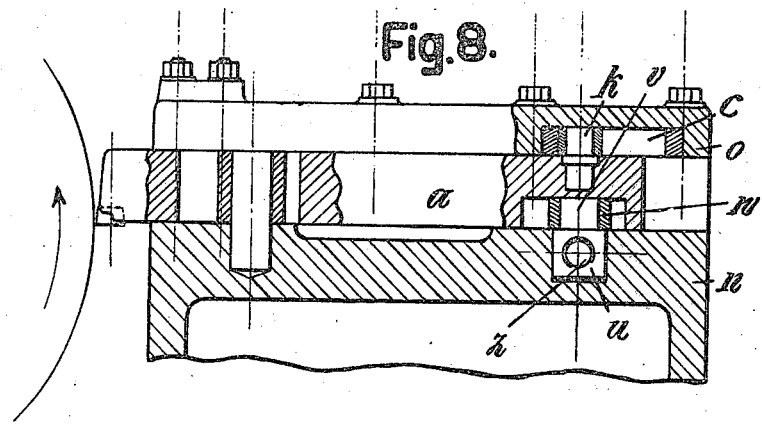
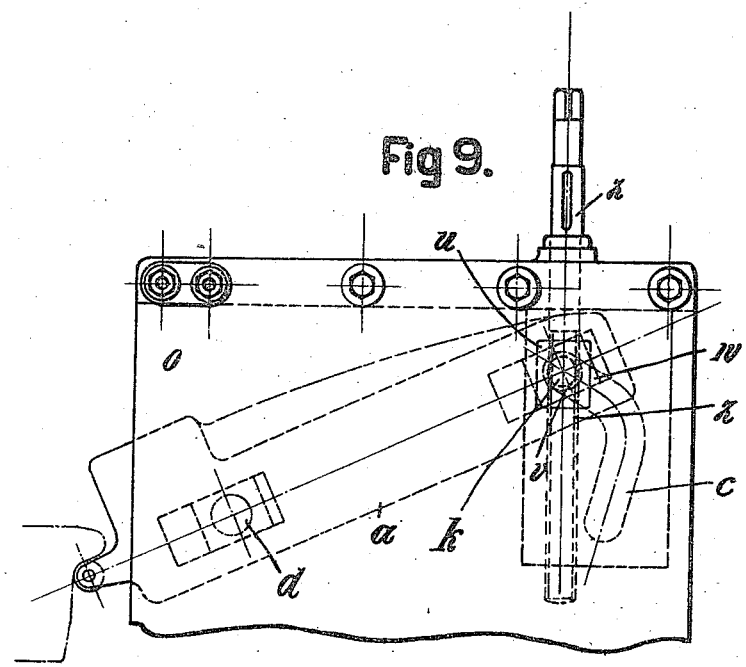

June 26, 1923.

E. BLAU 1,459,874

CURVE FORMING REST FOR MACHINE TOOLS

Filed April 12, 1922    7 Sheets-Sheet 6

Inventor:
Ernst Blau
By [signature]
Attorney.

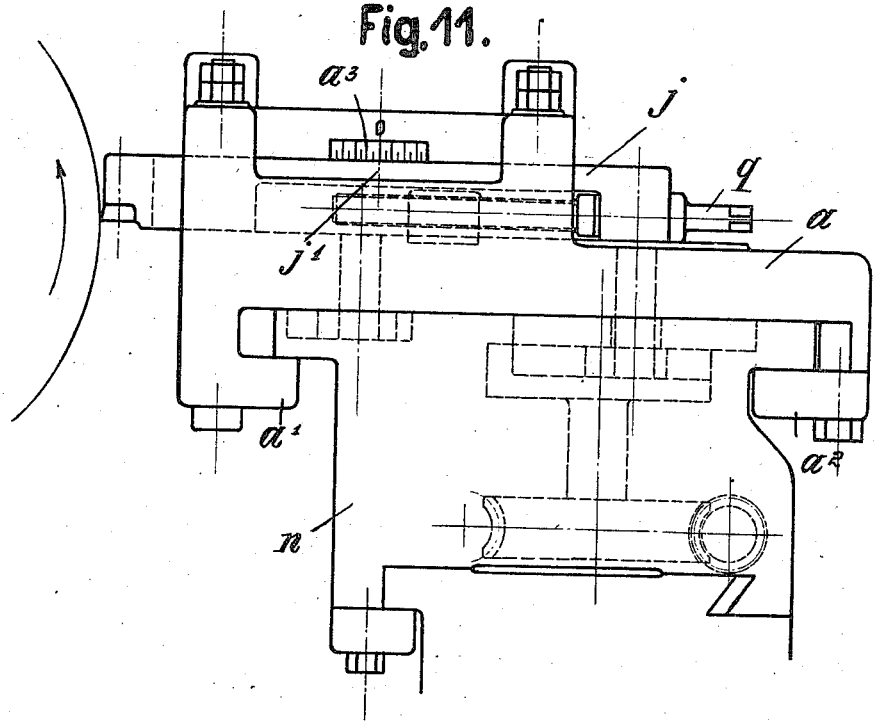
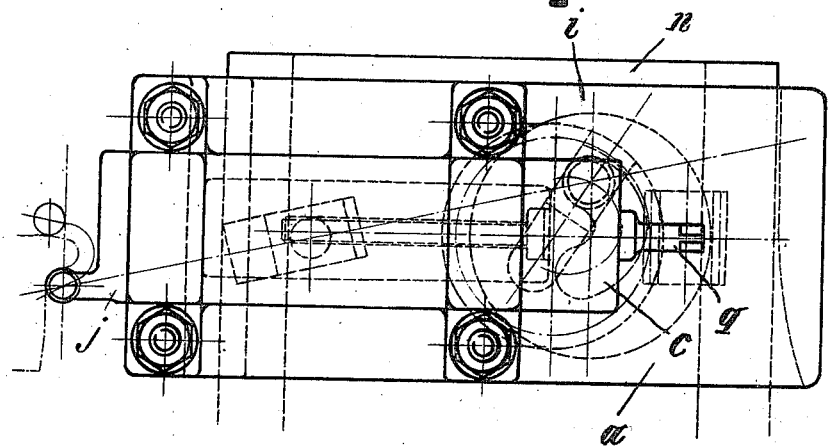

Patented June 26, 1923.

1,459,874

UNITED STATES PATENT OFFICE.

ERNST BLAU, OF RATIBOR, GERMANY.

CURVE-FORMING REST FOR MACHINE TOOLS.

Application filed April 12, 1922. Serial No. 551,990.

*To all whom it may concern:*

Be it known that I, ERNST BLAU, engineer, citizen of the German Republic, residing at Ratibor, Germany, have invented certain new and useful Improvements in Curve-Forming Rests for Machine Tools, of which the following is a specification.

To work or machine the flanges and treads of wheel rims a variety of known devices exist which will cut and machine the profiles by automatic operating means. Such devices are based upon the principle that the lathe tool or turning tool is guided by two displaceable slides, of which one lies above the other, the upper slide moving in a template and both moving at right angles to one another.

The present invention consists in substituting for the before-mentioned two slides, a tool carrier in the form of a lever connected with a pivot in such a manner that it may oscillate upon the pivot and may also move along it so that the tool carrier may, by any suitable driving means, follow the curve of a template. For this purpose it is necessary to combine the lever with the driving medium in such a way that it will not be forced to follow the movement imparted to it by the driving medium, but follow a movement and direction of a template by means of a movable slide. In this way it is possible, by choosing the right form of template, for the point of the lever, in which the tool is secured, to describe the correct path of curve to produce the required profile.

The advantages obtained by this improvement consist in the simplicity of the combination and arrangement of parts. The frictional resistance in the slide guides is greatly reduced which in the constructions hitherto known consumed the greatest part of the power transmitted to the device. This device makes it possible to apply the power transmitting elements approximately in the same plane in which the work resistance acts when taking off a cutting.

The lever forming the tool carrier may be oscillated in a number of ways and by a variety of means, but a condition to be fulfilled in every case is that the driving means be so chosen that one point of the lever can move in the curve of a template, from which follows that in case of unchangeability of the lever ratio the tool can describe only one path of curve while by adjusting the lever the lever ratios can be adjusted for a definite path of curve.

The invention is illustrated by way of example, in Figures 1 to 12 of the accompanying drawings wherein combinations and arrangements of parts are devised partly for machining of wheel flanges and partly for the machining of wheel treads, the lever, that is the tool carrier, being in some cases one-armed and in the remaining cases two-armed as will more fully appear from the detailed description.

In the drawings:

Figure 1 is a side view of the frame with the tool holder,

Fig. 1ª is a plan view of the same,

Fig. 2 is a plan view of a modification showing a one-armed lever for machining the wheel flange, Fig. 3 is a plan view of a similar modification for machining the wheel tread, Fig. 4 is a plan view of another modification showing a double armed lever for machining the wheel flange, Fig. 5 is a plan view of a similar modification for machining the wheel tread, Fig. 6 is a side view partly in section through the frame and tool holder of another modification, Fig. 7 is a plan view of the same, Fig. 8 is a side view partly in section through the frame and tool holder of another modification, Fig. 9 is a side view of the same, Fig. 10 is a side view showing the frame and tool holder of Figs. 1 and 1ª.

Fig. 10ª is an end view thereof,

Fig. 11 is a side view of still another modification, and

Fig. 12 is a plan view thereof.

Figure 1:
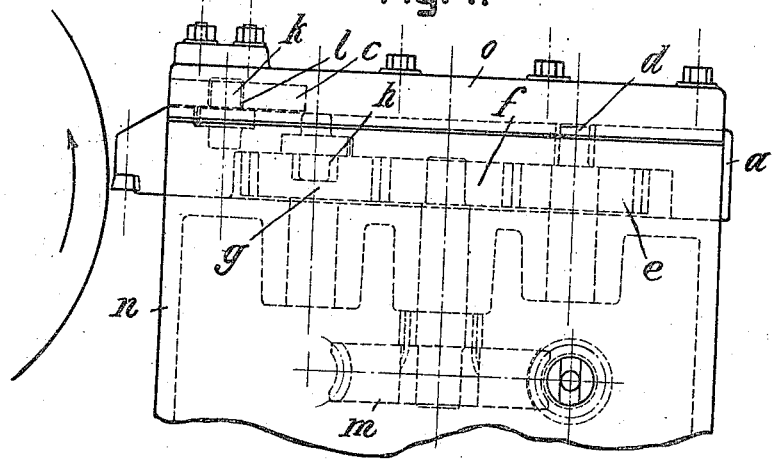
Figure 1A:
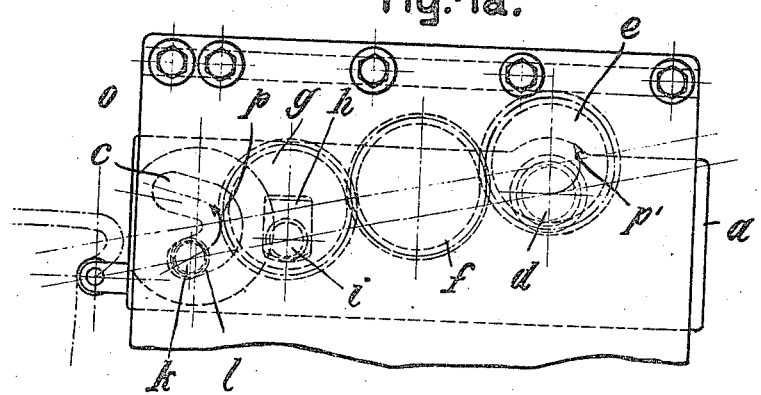

The tool holder $a$, Fig. 1, which is guided at its upper and lower surfaces between the frame $n$ and the cover $o$, but has free play for its motion to the left and to the right below the cover, is moved in the direction of the arrow by the crank pin $d$ of the toothed crank wheel $e$. The crank pin engages a bore of the tool holder which by moving it in the direction of the arrow, the pivot $k$ being firmly connected in the tool holder, is with its roll $l$ compelled to move in the track of the template $c$, said template being firmly connected with the cover $o$ but which motion extends only to about the turning point $p$ of the template. The turning point then will correspond to the position $p'$ of the axis of the crank pin $d$. From this point the pivot $k$ with the roll $l$ would not be compelled to follow the continuation of the template curve in the same direction of motion if it were not for the forward toothed crank wheel $g$ which receives in a slot the slide $h$ having a pivot $i$ firmly secured to the tool carrier. The crank wheel $g$ rotates in the same direction as the crank wheel $e$ in view of which the pivot $k$ is compelled to traverse the complete curve of the template. As long as the shape of the curve deviates from a circle, the slide $h$ will be radially displaced with respect to the crank wheel $g$.

Power may be supplied in any suitable manner as for instance by means of a gear wheel $m$ which is fixed to the shaft of the gear wheel $f$ which latter drives both gear wheels $e$ and $g$. In this form of construction the crank pin $d$ has a fixed radius with respect to the crank wheel $e$ whereas the crank pin $i$ of wheel $g$ has a varying radius to conform with the template $c$. In view of the fact that the template is located in the cover it can be readily changed.

Figure 2:
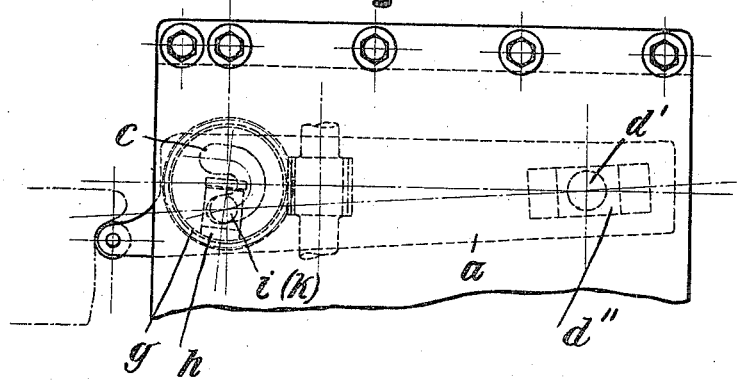

Fig. 2 shows a similar form of construction, but the crank pin $d'$ has an unvarying radius and constitutes a stationary pivot. The tool carrier is represented as a one-armed lever. The pivot $i$ ($k$) is secured in the tool holder and slides by means of slide $h$, in the gear wheel $g$. The pivot $k$ extends in the axial elongation of the pivot $i$ and is guided in the template $c$. The crank pin $d'$ has a slide $d''$, which slide is slidably secured in the tool carrier $a$. This crank pin $d'$ is the equivalent of the pivot $d$ in Figs. 1 and 1ª when taken as a zero radius.

Figure 3:
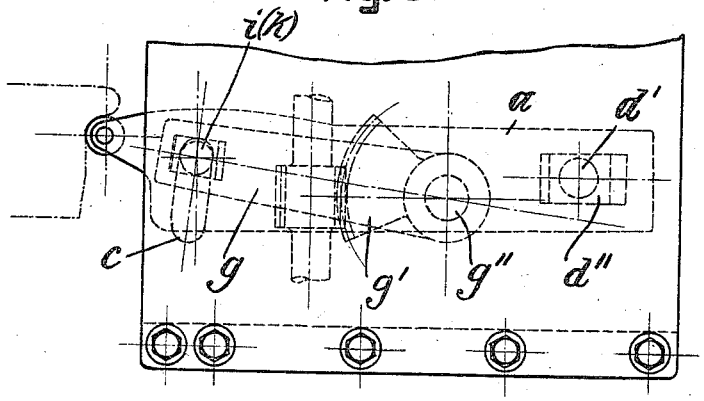

Fig. 3 shows a similar arrangement for machining the wheel tread, the lever $a$ being in this case one-armed. The slotted arm $g$ is secured upon the axle $g''$ which also carries the gear wheel $g'$.

Figure 4:
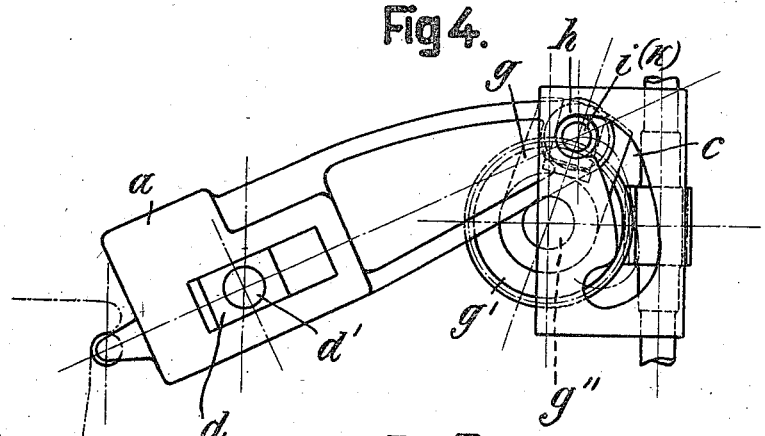

Fig. 4 shows an arrangement for machining the wheel flange, the lever being two-armed. The crank which is driven by a worm and a worm wheel $g'$ operates, by the mediation of the slide $h$, the pivot $i$ which is attached to the lever $a$ and engages the template $c$. The slide $h$ is secured in a slot in the crank arm.

Figure 5:
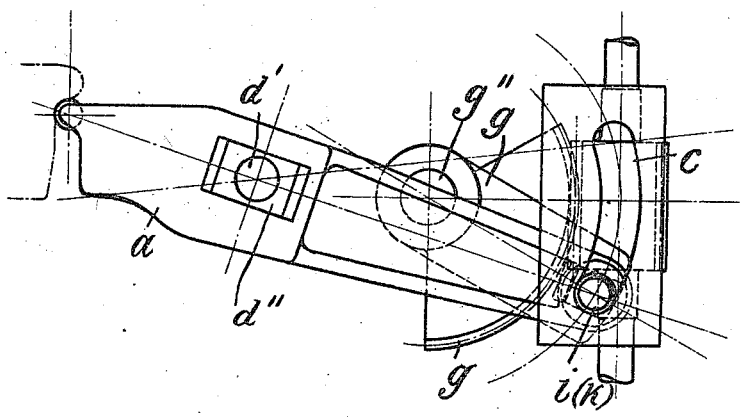

Fig. 5 shows an arrangement for machining the wheel tread, the lever being two-armed. The means for operating the crank wheel $g$ are similar to those shown in Fig. 4.

Figs. 6 and 7 show in vertical section and in plan, an arrangement in which the lever is moved not by cranks, as in the other forms of construction, but by a curved rack $s$ which is firmly connected with the lever $a$, as well as by a pinion $t$. This latter is supported in the frame $n$ and rolls along the curved rack $s$ and oscillates it together with the lever $a$. The curve of path which any point of the lever describes during that motion is again determined by the shape of the template $c$ in which a pivot $t'$ centrally connected with the pinion $t$ is guided, whereas the template $c$ is firmly connected with the lever $a$.

By guiding the pivot $t'$ in the template, secures at the same time the catch between the pinion $t$ and the curved rack $s$, while the pivot $t'$ is centrally located on the axle of the pinion $t$. In this way the same operation is obtained as in the slotted crank wheel of Figs. 1 to 5. For the sliding means, the crank in $d$ is used. The template is secured to the tool holder $a$.

Figures 8 and 9 show an arrangement in which the motion of the lever $a$ is initiated by a threaded spindle $z$ and a nut $u$, which latter is provided with a pivot $v$ in order to permit the oscillatory motion of the lever by the template $c$. The lever may be displaced at said pivot by the mediation of a slide $w$, and is guided in the template by a pivot $k$.

In all examples above described the tool is attached immovably to the lever $a$ and describes consequently, while the lever always oscillates in the path forced upon it by the template.

Figure 10:
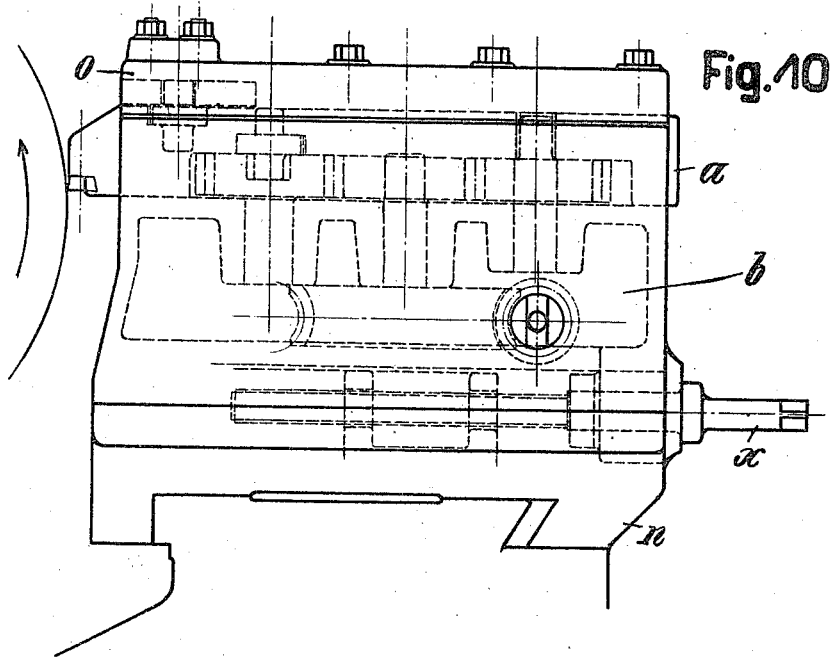
Figure 10A:
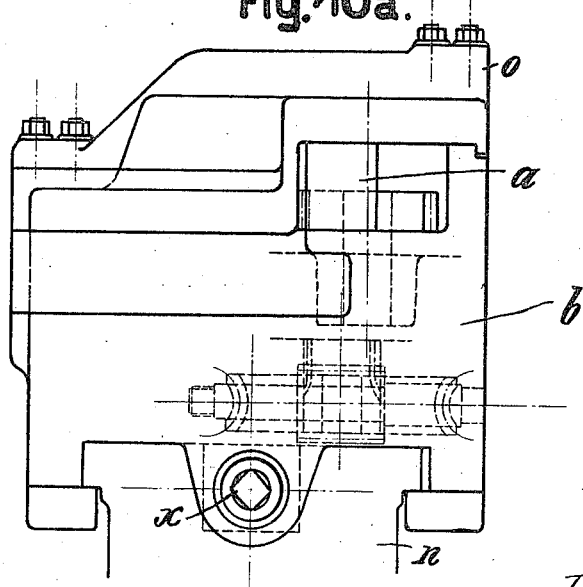

In order to provide for a tool which is immovably attached to the lever the necessary possibility of adjusting the cutting, the driving means for the lever $a$, etc., this lever must be enclosed in a casing $b$ (Figs. 10 and 10ª) adapted to be displaced, for instance, by means of a spindle $z$.

It may, however, be advantageous to change the position of the tool holder $j$, as shown in Figs. 11 and 12. The tool holder $j$ which is devised as a slide in this instance lies in the lever $a$ which is constructed to form the tool carrier and into which driving means, for instance, such as shown in Fig. 4, may be built in. The tool carrier has hock-shaped ledges $a'$ $a''$ extending below the frame portion $n$. Between said ledges and this frame portion sufficient space for the motion of the tool carrier must be left. The tool holder $j$ is held against the work piece by a threaded spindle $q$.

It is evident that when changing the position of the tool holder $j$ also the lever ratios are changed and the curve of the path of the tool becomes another one corresponding to the changed lever ratios. The tool describes the desired curve of path only if it stands in that position for which the template has been constructed. In smoothing the work piece the tool must move exactly in the prescribed curve. This is attained in a manner as follows:

The tool holder $j$ has a mark line $j'$ and the tool carrier $a$ has scale $a^3$. At a certain place the scale has a mark indicating that position of the tool holder $j$ which corresponds to the lever-ratio forming the base for the construction of the template curve. This mark may be designated by zero. For the first operation the tool holder $j$ is withdrawn, at first only so much that the tool does not contact with the work piece. Then it is advanced until the desired depth for the cutting is reached. For the smoothing operation the tool holder $j$ is so adjusted that the mark line $j'$ coincides with the zero-point of the scale, whereby the lever ratio forming the base for the construction of the template curve is re-established. In lieu of the scale and the mark line an abutment or equivalent means suited for the proper adjustment of the tool may be employed.

The curve rest above described may be used not merely for working or machining flanges and treads of wheel rims, but also for working or machining parts of any other description.

I claim as my invention:

1. A curve rest for the manufacture of curved profiles comprising a swinging tool holder having a pivot; a template adapted to guide said pivot; and driving means for moving said holder including a crank pin.

2. A curve rest for the manufacture of curved profiles comprising a lever in the form of a tool holder; a frame for said lever; means for imparting an oscillating motion to said lever; means for imparting a sliding motion to said lever; and means on said lever for imparting a motion to the tool of said lever comprising the path of a pre-determined template.

3. A curve forming rest for machine tools comprising a frame; a tool holder movably supported in said frame; a cover for said support and provided with a template; a pin secured to said tool holder and projected in said template; and means for moving said tool holder in the predetermined manner.

4. A curve forming rest for machine tools comprising a frame; a tool holder slidably mounted in said frame; a cover for said support and provided with a groove; a pin secured to said tool holder and projecting into said groove; and means including a gear wheel for moving said tool holder in the predetermined manner.

5. A curve forming rest for machine tools comprising a frame having a pivot pin mounted therein; a tool holder slidably mounted on said pin; a cover for said frame and provided with a groove; a second pin secured in said holder and projecting into said groove; and means including a gear wheel for moving said tool holder in the predetermined manner.

6. A curve forming rest for machine tools comprising a frame having a pivot pin mounted therein; a tool holder slidably and pivotally mounted on said pin; a cover for said frame and provided with a groove comprising a template of predetermined curvature; a second pin secured in said holder and projecting into said groove; and means slidably and rotatably connected with said second pin for moving said tool holder in the predetermined manner dependent upon said groove.

7. A curve rest for curved profiles comprising a frame; a tool holder supported in said frame and capable of forward and lateral movements; a template associated with said tool holder; and means for moving the tool holder to follow the curve of the template.

In testimony whereof I have affixed my signature.

ERNST BLAU.